United States Patent
Kim et al.

(10) Patent No.: US 9,438,830 B2
(45) Date of Patent: Sep. 6, 2016

(54) ANALOG-TO-DIGITAL CONVERTER AND CMOS IMAGE SENSOR INCLUDING THE SAME

(71) Applicant: SK hynix Inc., Gyeonggi-do (KR)

(72) Inventors: Jin-Seon Kim, Gyeonggi-do (KR); Eun-Jun Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 74 days.

(21) Appl. No.: 14/491,775

(22) Filed: Sep. 19, 2014

(65) Prior Publication Data

US 2015/0281603 A1   Oct. 1, 2015

(30) Foreign Application Priority Data

Mar. 28, 2014   (KR) .................. 10-2014-0036759

(51) Int. Cl.
*H04N 5/357*   (2011.01)
*H04N 5/3745*   (2011.01)
*H04N 5/374*   (2011.01)

(52) U.S. Cl.
CPC .......... *H04N 5/3575* (2013.01); *H04N 5/3742* (2013.01); *H04N 5/37455* (2013.01)

(58) Field of Classification Search
CPC ............. H04N 5/2176; H04N 5/2178; H04N 5/3575; H04N 5/37455
USPC .................................... 348/241, 243, 245
See application file for complete search history.

(56) References Cited

U.S. PATENT DOCUMENTS

| | | | |
|---|---|---|---|
| 8,072,512 B2 * | 12/2011 | Lee ..................... | H03M 1/1019 348/241 |
| 2007/0132868 A1 * | 6/2007 | Lee ..................... | H03M 1/1019 348/308 |
| 2015/0208009 A1 * | 7/2015 | Oh ......................... | H04N 5/378 348/302 |

* cited by examiner

*Primary Examiner* — Tuan Ho
(74) *Attorney, Agent, or Firm* — IP & T Group LLP

(57) ABSTRACT

A CMOS image sensor includes an active pixel array suitable for generating an active pixel signal, a dummy pixel array suitable for generating a dummy pixel signal, a row driver suitable for controlling the active pixel array and the dummy pixel array to simultaneously operate at a same column, and a correlated double sampling (CDS) array suitable for generating an active sampling signal and a dummy sampling signal, which are sampled from the active pixel signal and the dummy pixel signal by using a correlated double sampling, respectively, based on a first ramp signal and a second ramp signal, and comparing the active sampling signal with the dummy sampling signal.

25 Claims, 5 Drawing Sheets

US 9,438,830 B2

ANALOG-TO-DIGITAL CONVERTER AND CMOS IMAGE SENSOR INCLUDING THE SAME

CROSS-REFERENCE TO RELATED APPLICATIONS

The present application claims priority of Korean Patent Application No. 10-2014-0036759, and filed on Mar. 28, 2014, which is incorporated herein by reference in its entirety.

BACKGROUND

1. Field

Various embodiments of the present invention relate to a complementary metal oxide semiconductor (CMOS) image sensor, more particularly, to an analog-to-digital converter and a CMOS image sensor including the same.

2. Description of the Related Art

FIG. 1 is a block diagram illustrating a conventional CMOS image sensor including an analog-to-digital converter of a column parallel scheme.

Referring to FIG. 1, the conventional CMOS image sensor includes a row driver 110, an active pixel array 120, an optical black (OB) pixel array 122, that is, a dummy pixel array, an analog-to-digital converter 145 including a reference voltage generator 130, a correlated double sampling (CDS) array 140 and a ramp signal generator 160, and a digital code output unit 150.

The row driver 110 generates various control signals RX, TX and SEL for controlling pixels of the active pixel array 120 and the OB pixel array 122. The active pixel array 120 outputs an active pixel signal APS_O corresponding to each column, and the OB pixel array 122 outputs an OB pixel signal OB_O as a column signal.

Since a power voltage which is the same as a power supply voltage provided to the active pixel array, is provided to the OB pixel array 122, it may be possible to transfer a noise which is the same as a power supply voltage noise, hereinafter, referred to as "a power noise", generated in the active pixel array 120 through the OB pixel signal OB_O. An upper portion of the OB pixel array 122 is doped with a material, which blocks a light from passing through the OB pixel array 122, and the OB pixel array 122 may efficiently transfer the power noise using a block level signal.

The analog-to-digital converter 145 includes the reference voltage generator 130, the CDS array 140 and the ramp signal generator 160. The reference voltage generator 130 generates a correlated double sampled OB sampling signal from the OB pixel signal OB_O based on the OB pixel signal OB_O and a first ramp signal RAMP_R, and generates a second reference voltage REF_C based on a first reference voltage REF_OB and the generated OB sampling signal.

The CDS array 140 receives an active pixel signal APS_O, a second ramp signal RAMP_C and the second reference voltage REF_C, and generates an active sampling signal of correlated double sampling from the active pixel signal APS_O based on the active pixel signal APS_O and the second ramp signal RAMP_C. The CDS array 140 compares the generated active sampling signal with the second reference voltage REF_C to generate a comparison result signal CDS_O for generating a digital code.

The first ramp signal RAMP_R and the second ramp signal RAMP_C may be generated from the ramp signal generator 160. Since a noise element may occur in the ramp signal generator 160, the first ramp signal RAMP_R and the second ramp signal RAMP_C may be generated by a single ramp signal generator. The first ramp signal RAMP_R for generating a reference voltage which is different from the second ramp signal RAMP_C, and maintains a uniform voltage level without changing the voltage level before or after, a ramp operation is performed.

The digital code output unit 150 receives the comparison result signal CDS_O from the CDS array 140, and generates the digital code value for a digital signal processing of an image signal processor (ISP) based on the comparison result signal CDS_O.

FIG. 2 is a detailed diagram of the reference voltage generator 130 and the CDS array 140 shown in FIG. 1.

Referring to FIG. 2, the reference voltage generator 130 may include an OB CDS circuit 132 for generating the OB sampling signal on an input node IN_OB of a differential comparator A1 and an output amplifier A3 for buffering the OB sampling signal to generate a second reference voltage REF_C.

The OB CDS circuit 132 may include a comparison unit 133, a signal transmission capacitor C3 coupled to the comparison unit 133, a fourth switch S4 coupled to the signal transmission capacitor C3 in parallel and an amplifier A2.

The comparison unit 133 may include a first switch S1 for controlling a transmission of an OB pixel signal OB_O, a second switch S2 for controlling a transmission of a first ramp signal RAMP_R, a blocking capacitor coupled between the first switch S1 and the second switch S2, a storage capacitor C2 coupled to the first switch S1 for providing an OB sampling signal, a third switch S3 coupled to the differential comparator A1, and the differential comparator A1. The comparison unit 133 receives the OB sampling signal and compares the OB sampling signal with a first reference voltage REF_OB.

The blocking capacitor C1 transfers a voltage variation amount irrespective of a voltage level of the ramp signal.

The CDS array 140 includes a first active CDS circuit 142, a second active CDS circuit 144, and an Nth active CDS circuit 146 at each column, which are operated based on a first active pixel signal APS_O_1, a second active pixel signal APS_O_2, an Nth active pixel signal APS_O_n. Each of the active CDS circuits 142, 144 and 146 has a same structure as the OBCDS circuit 132 of the reference voltage generator 130.

A power supply voltage provided to the active pixel array 120 is provided to the OB pixel array 122 and the reference voltage generator 130. A noise element of an active sampling operation may be removed through a reference voltage, which is generated using the OB CDS circuit 152 having a same structure as the active CDS circuits 142, 144 and 146.

However, since a conventional noise reduction scheme as described above reduces a power noise of a pixel by generating a reference voltage using the OB pixel signal OB_O outputted from the OB pixels, that is, dummy pixels, which are arrayed in a column direction, and using the generated reference voltage as a reference voltage of all active pixel columns, the conventional noise reduction scheme has demerits since a separate reference voltage generator and many OB pixels for obtaining a representative value are needed.

Moreover, since the conventional noise reduction scheme obtains the representative value, the accuracy is lowered, and the power noise of the pixel is not perfectly removed.

In the conventional noise reduction scheme, when the reference voltage generator performs a process of the OB pixel signal OB_O, the first reference voltage REF_OB and an additional circuit, for example, an output amplifier A3, may be a different noise source.

SUMMARY

Various embodiments of the present invention are directed to an analog-to-digital converter and a CMOS image sensor including the same for reducing a horizontal direction noise by removing a power noise generated from a pixel array using an one to one matching operation of an active pixel and an OB pixel of a row direction.

In addition, various embodiments of the present invention are directed to an analog-to-digital converter and a CMOS image sensor including the same for reducing a horizontal direction noise by removing a ramp noise generated from a ramp signal generator using a matching operation of an input node of a comparator.

In accordance with an embodiment of the present invention, an analog-to-digital converter includes a dummy sampling signal generation unit suitable for generating a dummy sampling signal, which is sampled from a dummy pixel signal outputted from a dummy pixel array by using a correlated double sampling, based on a first ramp signal; an active sampling signal generation unit suitable for generating an active sampling signal, which is sampled from an active pixel signal outputted from an active pixel array by using a correlated double sampling, based on a second ramp signal; and a comparison unit suitable for comparing the dummy sampling signal with the active sampling signal.

The dummy pixel array may include an optical black (OB) pixel array.

The dummy sampling signal generation unit and the active sampling signal generation unit may have a differential input structure using a same circuit.

The dummy sampling signal generation unit may include a first switch suitable for controlling a transmission of the dummy pixel signal; a first blocking capacitor coupled between an input node of the first ramp signal and an output node of the first switch; and a first signal storage capacitor coupled to the output node of the first switch, and suitable for providing the OB sampling signal.

The active sampling signal generation unit may include a second switch suitable for controlling a transmission of the active pixel signal; a second blocking capacitor coupled between an input node of the second ramp signal and an output node of the second switch; and a second signal storage capacitor coupled to the output node of the second switch, and suitable for providing the active sampling signal.

The first switch and the second switch may have a same element, the first blocking capacitor and the second capacitor may have a same element, and the first signal storage capacitor and the second signal storage capacitor may have a same element.

The active pixel signal and the dummy pixel signal may have a same noise characteristic, and the first ramp signal and the second ramp signal may have a same noise characteristic.

An input of the comparison unit may be expressed as, $Vinp-Vinm=(RAMP-RAMP\_REF)-(APS\_O-OB\_O)$, where Vinp–Vinm denotes the input of the comparison unit, RAMP denotes the first ramp signal, RAMP_REF denotes the second ramp signal, APS_O denotes the active pixel signal and OB_O denotes the dummy pixel signal.

The dummy pixel array may have a same horizontal characteristic as the active pixel array.

Dummy pixels included in the dummy pixel array may be matched one to one with active pixels included in the active pixel array at each column.

In accordance with another embodiment of the present invention, an analog-to-digital converter includes a dummy sampling signal generation unit suitable for generating an OB sampling signal, which is sampled from a dummy pixel signal outputted from a dummy pixel array by using a correlated double sampling; an active sampling signal generation unit suitable for generating an active sampling signal, which is sampled from an active pixel signal outputted from an active pixel array by using a correlated double sampling; and a comparison unit suitable for comparing the dummy sampling signal with the active sampling signal.

The dummy pixel array may include an optical black (OB) pixel array.

In accordance with another embodiment of the present invention, a CMOS image sensor includes an active pixel array suitable for generating an active pixel signal; a dummy pixel array suitable for generating a dummy pixel signal; a row driver suitable for controlling the active pixel array and the dummy pixel array to simultaneously operate at a same column; and a correlated double sampling (CDS) array suitable for generating an active sampling signal and an OB sampling signal, which are sampled from the active pixel signal and the dummy pixel signal by using a correlated double sampling, respectively, based on a first ramp signal and a second ramp signal, and comparing the active sampling signal with the dummy sampling signal.

The dummy pixel array may include an optical black (OB) pixel array.

The CDS array may include a CDS circuit at each column, and the CDS circuit may include a dummy sampling signal generation unit suitable for generating the dummy sampling signal sampled from the dummy pixel signal based on the first ramp signal; an active sampling signal generation unit suitable for generating the active sampling signal from the active pixel signal based on the second ramp signal; and a comparison unit suitable for comparing the dummy sampling signal with the active sampling signal.

The dummy sampling signal generation unit and the active sampling signal generation unit may include a differential input structure using a same circuit.

An input of the comparison unit may be expressed as, $Vinp-Vinm=(RAMP-RAMP\_REF)-(APS\_O-OB\_O)$, where Vinp–Vinm denotes the input of the comparison unit, RAMP denotes the first ramp signal, RAMP_REF denotes the second ramp signal, APS_O denotes the active pixel signal and OB_O denotes the dummy pixel signal.

The active pixel signal and the dummy pixel signal may have a same noise characteristic, and the first ramp signal and the second ramp signal may have a same noise characteristic.

The dummy pixel array may be disposed along a row direction to form at least a row and to have a same horizontal characteristic as the active pixel array.

Dummy pixels included in the dummy pixel array may be matched one to one with active pixels included in the active pixel array at each column.

In accordance with another embodiment of the present invention, a CMOS image sensor includes an active pixel array suitable for generating an active pixel signal; a dummy pixel array suitable for generating a dummy pixel signal; a row driver suitable for controlling the active pixel array and the dummy pixel array to simultaneously operate at a same column; and a correlated double sampling (CDS) array suitable for generating an active sampling signal and a dummy sampling signal, which are sampled from the active pixel signal and the dummy pixel signal by using a correlated double sampling, respectively, and comparing the active sampling signal with the dummy sampling signal.

The dummy pixel array may include an optical black (OB) pixel array.

The dummy pixel array may be disposed along a row direction to have a same horizontal characteristic as the active pixel array.

In accordance with another embodiment of the present invention, a CMOS image sensor includes an active pixel array suitable for generating an active pixel signal; a dummy pixel array suitable for generating a dummy pixel signal, wherein the dummy pixel array includes the dummy pixels corresponding one to one to active pixels included in the active pixel array at each column; a row driver suitable for controlling the active pixel array and the dummy pixel array to simultaneously operate at a same column; and a correlated double sampling (CDS) array suitable for generating an active sampling signal and a dummy sampling signal, which are sampled from the active pixel signal and the dummy pixel signal by using a correlated double sampling.

The dummy pixel array may include an optical black (OB) pixel array.

DETAILED DESCRIPTION

Figure 1:
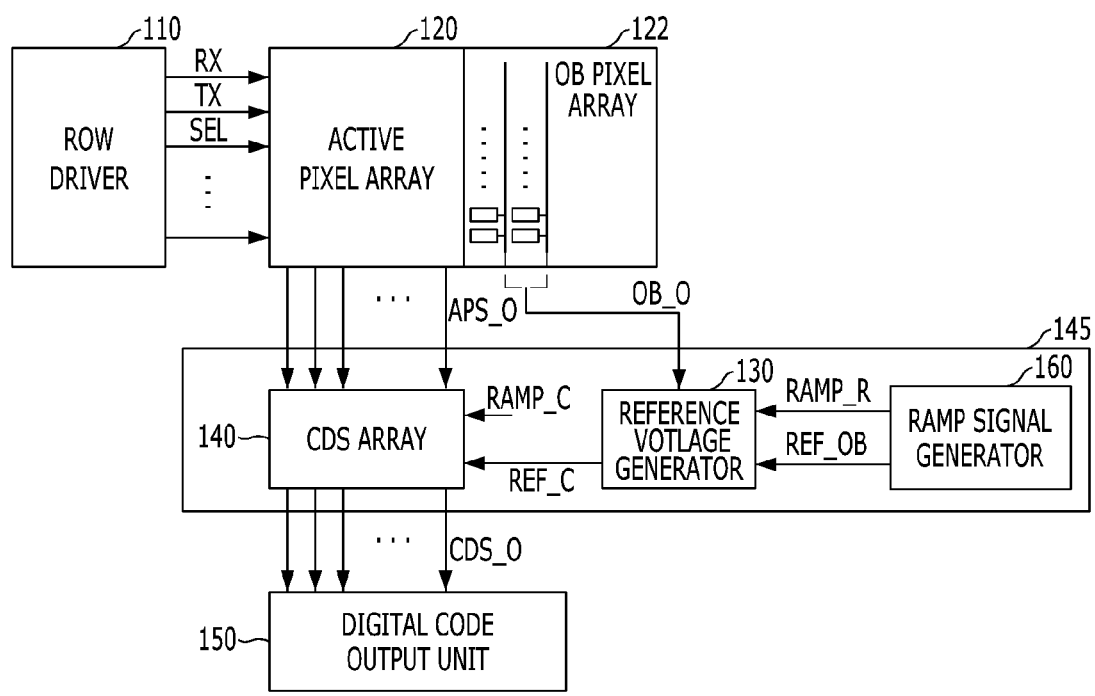
FIG. 1 is a block diagram illustrating a conventional CMOS image sensor including an analog-to-digital converter of a column parallel scheme.
Figure 2:
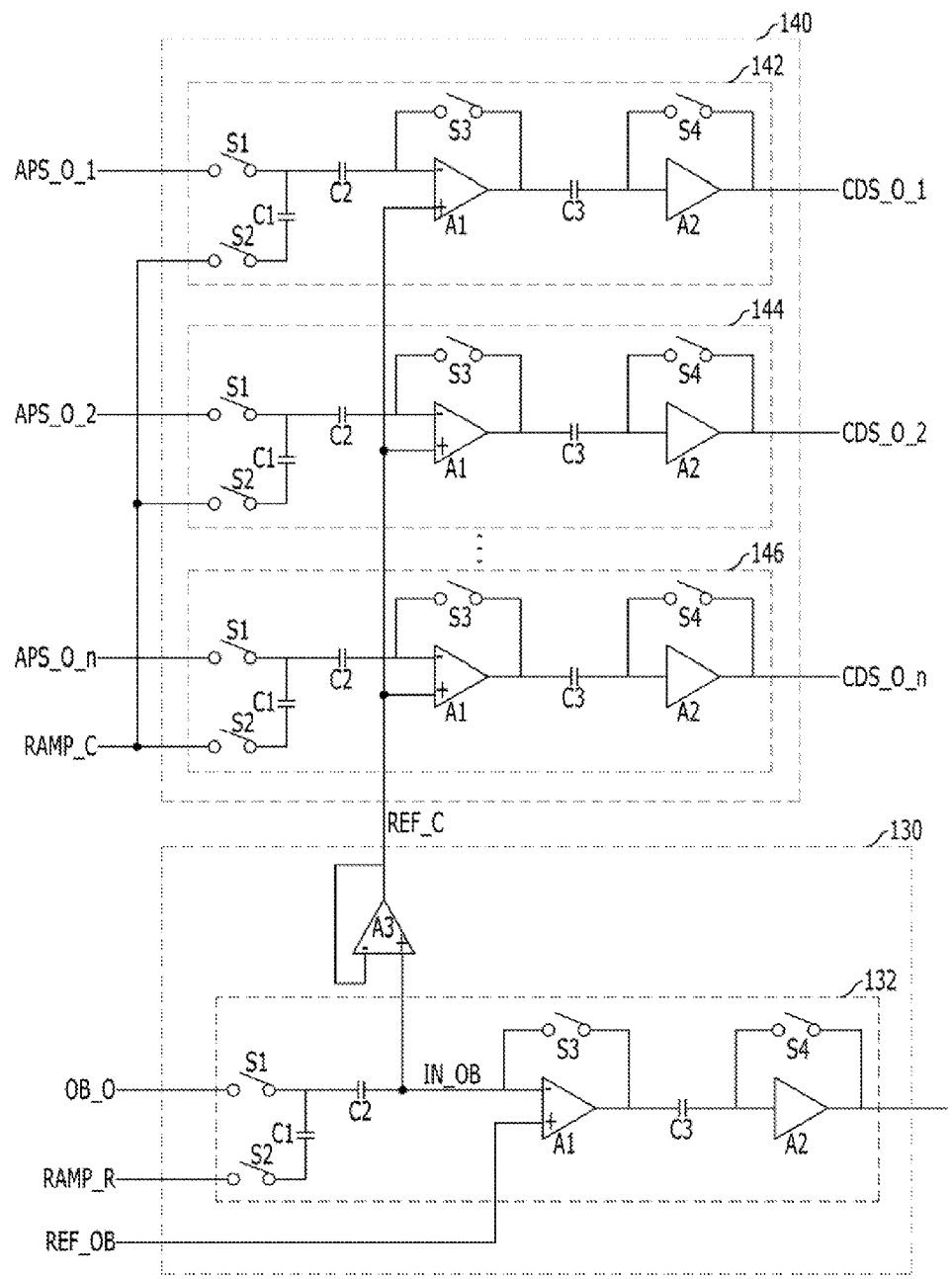
FIG. 2 is a detailed diagram of a reference voltage generator and a CDS array shown in FIG. 1.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like parts in the various figures and embodiments of the present invention.

The drawings are not necessarily to scale and in some instances, proportions may have been exaggerated to clearly illustrate features of the embodiments. In this specification, specific terms have been used. The terms are used to describe the present invention, and are not used to qualify or limit the scope of the present invention.

It is also noted that in this specification, "and/or" represents that one or more of components arranged before and after "and/or" is included. Furthermore, "connected/coupled" refers to one component not only directly coupling another component but also indirectly coupling another component through an intermediate component. In addition, a singular form may include a plural form as long as it is not specifically mentioned in a sentence. Furthermore, "include/ comprise" or "including/comprising" used in the specification represents that one or more components, steps, operations, and elements exists or are added.

In general, a power noise generated from a pixel array and a ramp noise generated from a ramp signal generator may cause a horizontal noise of a CMOS image sensor that deteriorates performance of the CMOS image sensor. Since the influence of the noise may increase as the number of pixels of the CMOS image sensor is increased, the quality of the pixel needs to be improved.

Thus, in various embodiments of the present invention, a power noise may be efficiently removed through matching an active pixel and an OB pixel of a row direction. A ramp noise generated from a ramp signal generator may be efficiently removed through a matching method of an input node of a comparator. Through this method, a horizontal noise may be highly improved using a small number of OB pixels.

Hereinafter, a CMOS image sensor including an analog-to-digital converter in accordance with an embodiment of the present will be described with reference to FIGS. 3 to 5.

Figure 3:
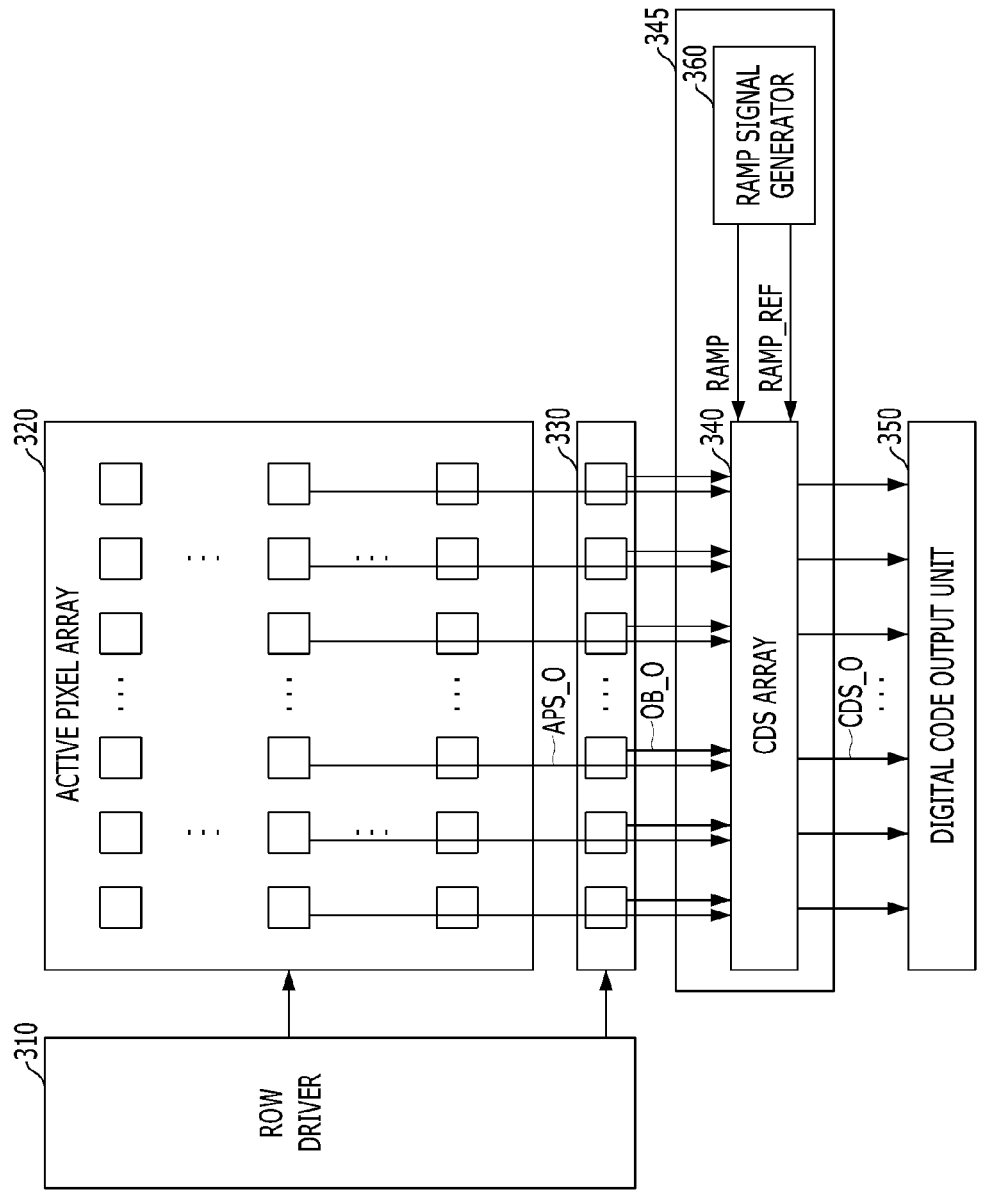
FIG. 3 is a block diagram illustrating a CMOS image sensor in accordance with an embodiment of the present invention.

FIG. 3 is a block diagram illustrating a CMOS image sensor in accordance with an embodiment of the present invention.

Referring to FIG. 3, the CMOS image sensor may include a row driver 310, an active pixel array 320, an optical black (OB) pixel array 330, an analog-to-digital converter 345 including a correlated double sampling (CDS) array 340 and a ramp signal generator 360, and a digital code output unit 350.

The row driver 310 may generate control signals RX, TX and SEL for controlling pixels of the active pixel array 320 and the OB pixel array 330, that is, a dummy pixel array.

The active pixel array 320 may output an active pixel signal APS_O corresponding to each columns. The OB pixel array 330 outputs an OB pixel signal OB_O or a dummy pixel signal, corresponding to each column. The row driver 310 controls the OB pixel array 330 to output the OB pixel signal OB_O from the OB pixel of the OB pixel array 330 corresponding to a column of the active pixel array 320 when the active pixel array 320 performs each column operation. Thus, if the active pixel array 320 outputs a first active pixel signal APS_O_1 corresponding to a first column, the OB pixel array 330 outputs a first OB pixel signal OB_O_1 corresponding to a first column.

The OB pixel array 330 includes the OB pixels of a row direction having a same horizontal characteristic as the active pixel array 320. The OB pixels of the row direction are disposed to form at least a row and to be matched one to one with the active pixels of the active pixel array 320. The OB pixel array 330 may be disposed at a lower portion of the active pixel array 320 as shown in FIG. 3, or at an upper portion of the active pixel array 320 in another embodiment of the present invention. Since a power supply voltage provided to the active pixel array 320 is provided to the OB pixel array 330, a power supply voltage noise, hereinafter, referred as to "power noise", which is the same as a power noise generated from the active pixel array 320, may be transferred to the OB pixel array 330 using the OB pixel signal OB_O. An upper portion of the OB pixel array 330 is doped with a material that blocks light. The OB pixel array 330 may transfer the power noise efficiently using a black level signal.

The analog-to-digital converter 345 includes the CDS array 340 and the ramp signal generator 360. The CDS array 340 may generate the active sampling signal and the OB sampling signal, which are sampled from the active pixel signal APS_O and the OB pixel signal OB_O by using a correlated double sampling, respectively, based on the active pixel signal APS_O, the OB pixel signal OB_O, a first ramp signal RAMP and a second ramp signal RAMP_REF. The CDS array 340 generates a comparison result signal CDS_O for digital code generation by comparing the active sampling signal with the OB sampling signal. The CDS array 340 includes two input circuits at each column, and the two input circuits include the same circuit to have the same characteristics. That is, two input circuits included in the CDS array 340 are matched such that two input nodes of a comparator have the same characteristics. The CDS array 340 receives the OB pixel signal OB_O outputted from the OB pixel of the OB pixel array 330 disposed at the same column as the active pixel of the active pixel array 320 during each column operation of the active pixel array 320. Detailed descriptions will follow with reference to FIG. 4.

The ramp signal generator 360 may generate the first ramp signal RAMP and the second ramp signal RAMP_REF. In addition, the first ramp signal RAMP and the second ramp signal RAMP_REF may be generated by a single ramp signal generator by considering a noise component that may occur in a ramp signal generator circuit. The second ramp signal RAMP_REF maintains a uniform voltage level without a change of voltage level before or after the ramp signal generator 360 operates. That is, the second ramp signal RAMP_REF has the same noise characteristic as the first ramp signal RAMP and is a signal which is not ramped.

The digital code output unit 350 generates a digital code value for a digital signal processing of an image signal processor based on the comparison result signal CDS_O outputted from the CDS array 340.

Figure 4:
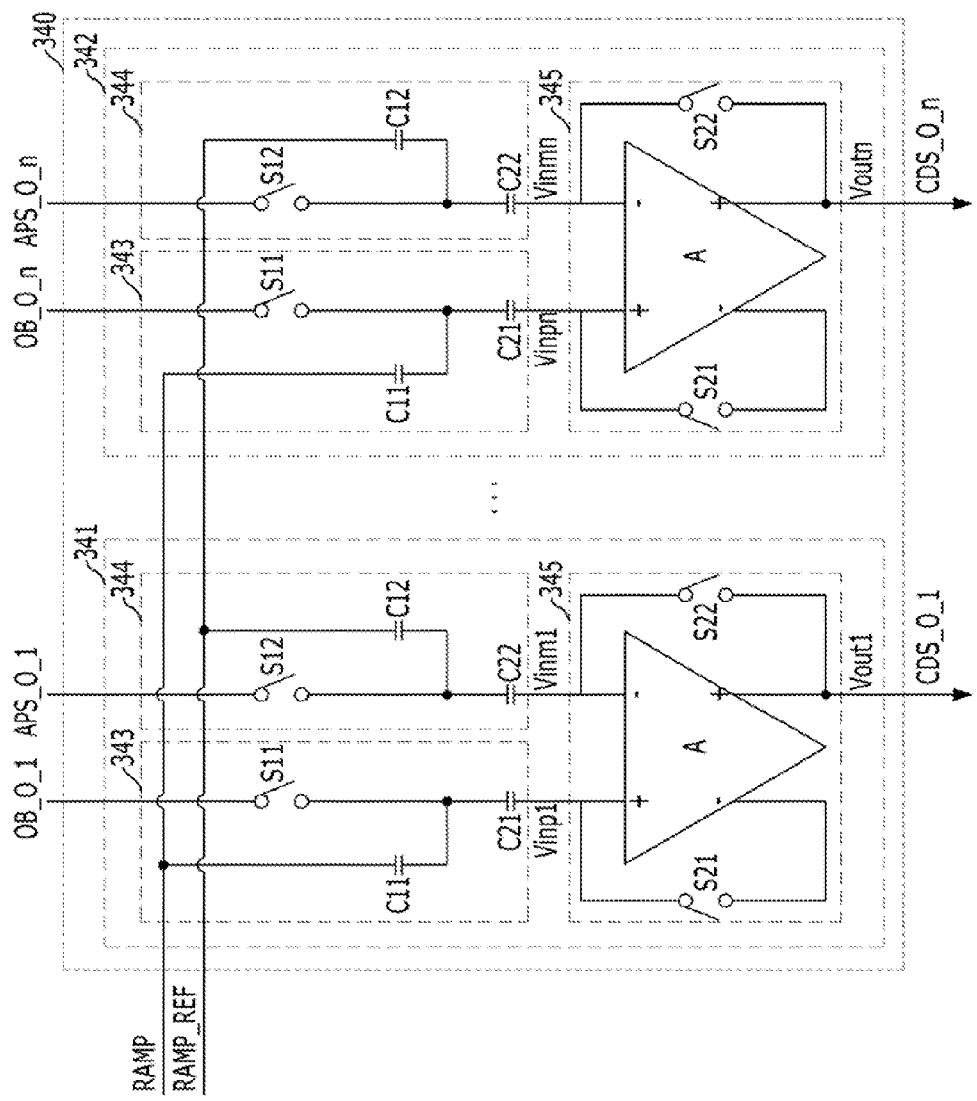
FIG. 4 is a detailed diagram of a CDS array shown in FIG. 3.

FIG. 4 is a detailed diagram of the CDS array 340 shown in FIG. 3.

Referring to FIG. 4, the CDS array 340 may include a plurality of CDS circuits 341 and 342, which correspond to the respective column.

The CDS circuits 341 and 342 may be implemented to have a differential input structure using the same circuit as an input circuit.

The active pixel signals APS_O_1 and APS_O_n outputted from the active pixel array 320, the OB pixel signals OB_O_1 and OB_O_n outputted from the OB pixel array 330, the first ramp signal RAMP and the second ramp signal RAMP_REF are used as differential input signals of the CDS circuits 341 and 342.

The CDS circuits 341 and 342 include an OB sampling signal generation unit 343, an active sampling signal generation unit 344 and a comparison unit 345. Since the CDS circuits 341 and 342 have the same structure, only the CDS circuit 341 will be described below.

The OB sampling signal generation unit 343 generates the OB sampling signal, which is sampled from the OB pixel signal OB_O_1 by using a correlated double sampling, based on the first ramp signal RAMP of the ramp signal generator 360 and the OB pixel signal OB_O_1 of the OB pixel array. The OB sampling signal generation unit 343 includes a first switch S11, a first blocking capacitor C11 and a first signal storage capacitor C21. The first switch S11 controls a transmission of the OB pixel signal OB_O. The first blocking capacitor C11 is coupled between an input node of the first ramp signal RAMP and an output node of the first switch S11. The first signal storage capacitor C21 is coupled to the output node of the first switch S11 and provides the OB sampling signal.

The active sampling signal generation unit 344 generates the active sampling signal, which is sampled from the active pixel signal APS_O_1 by using a correlated double sampling, based on the active pixel signal APS_O_1 of the active pixel array 320 and the second ramp signal RAMP_REF of the ramp signal generator 360. The active sampling signal generation unit 344 includes a second switch S12, a second blocking capacitor C12 and a second storage capacitor C22. The second switch S12 controls a transmission of the active pixel signal APS_O. The second blocking capacitor C12 is coupled between an input node of the second ramp signal RAMP_REF and an output node of the second switch S12. The second signal storage capacitor C22 is coupled to the output node of the second switch S12 and provides the active sampling signal.

The comparison unit 345 generates the comparison result signal CD_O_1 for the digital code generation by comparing the active sampling signal generated from the active sampling signal generation unit 344 with the OB sampling signal generated from the OB sampling signal generation unit 343. The comparison unit 345 includes a third switch S21, a fourth switch S22 and a differential comparator A. The comparison unit 345 compares the OB sampling signal generated from the OB sampling signal generation unit 343 and the active sampling signal generated from the active sampling signal generation unit 344, and generates the comparison result signal CDS_O_1 for the digital code generation.

The first switch S11 and the second switch S12 have a same element with the same characteristic. The first blocking capacitor C11 and the second blocking capacitor C12 have a same element with the same characteristic. The first signal storage capacitor C21 and the second signal storage capacitor C22 have a same element with the same characteristic. The third switch S21 and the fourth switch S22 have a same element with the same characteristic.

Figure 5:
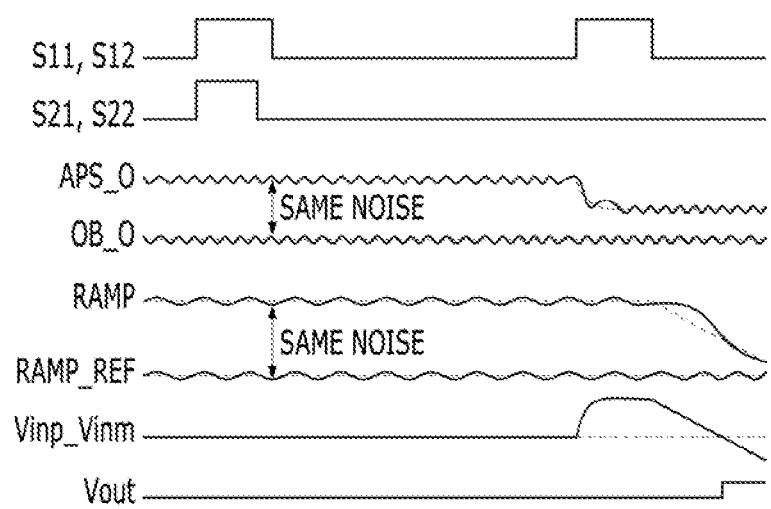
FIG. 5 is a timing diagram of the CDS array shown in FIG. 4.

As described above, the CDS circuit 341 has the same characteristics, such as, a same timing characteristic (as shown in FIG. 5), by using the same circuits as input circuits. The input of the comparator of the CDS circuit 341 is described as "Vinp−Vinm" as expressed in equation 1.

$$\text{``Vin}p-\text{Vin}m\text{''}=(\text{RAMP}-\text{RAMP\_REF})-(\text{APS\_}O-OB\_O) \quad \text{[Equation 1]}$$

As expressed in equation 1, a pixel power noise is removed by a differential operation of the active pixel signal APS_O and the OB pixel signal OB_O having the same noise characteristic. The ramp noise is removed by a differential operation of the first ramp signal RAMP and the second ramp signal RAMP_REF having the same noise characteristic.

FIG. 5 is a timing diagram of the CDS array 340 shown in FIG. 4. Referring to FIG. 5, the active pixel signal APS_O and the OB pixel signal OB_O having the same noise characteristic may be removed through a differential operation. The first ramp signal RAMP and the second ramp signal RAMP_REF having the same noise characteristic may be removed through a differential operation.

In an embodiment of the present invention, the active pixel signal APS_O, the OB pixel signal OB_O, the first ramp signal RAMP and the second ramp signal RAMP_REF are sampled at the same timing, and are inputted differentially. Thus, the pixel power noise and the ramp noise are finally removed by the OB pixel signal OB_O and the second ramp signal RAMP_REF as expressed in equation 1.

Referring to FIG. 5, a first high level period of the first and second switches S11 and S12 represents a reset sampling period of the CDS, and a second high level period of the first and second switches S11 and S12 represents a signal sampling period. The active pixel signal APS_O and the OB pixel signal OB_O have the same noise characteristic. The first ramp signal RAMP and the second ramp signal RAMP_REF have the same noise characteristic. Thus, as expressed in equation 1, the pixel power noise may be removed by the differential operation of the active pixel signal APS_O and the OB pixel signal OB_O. The ramp noise may be removed by the differential operation of the first ramp signal RAMP and the second ramp signal RAMP_REF.

As described above, in the embodiments of the present invention, the pixel power noise and the ramp noise may be efficiently removed by correctly matching the signals having the same noise characteristic using the same circuits.

In another embodiment of the present invention, a pixel power noise may be removed by matching one to one an OB pixel of a row direction with an active pixel, wherein, a ramp noise is not considered.

While the present invention has been described with respect to the specific embodiments, it will be apparent to those skilled in the art that various changes and modifications may be made without departing from the spirit and scope of the invention as defined in the following claims.

What is claimed is:

1. An analog-to-digital converter, comprising:
a ramp signal generator suitable for generating a first ramp signal and a second ramp signal; and
a correlated double sampling (CDS) array,
wherein the CDS array includes a CDS circuit at each column, and
wherein the CDS circuit includes:
a dummy sampling signal generation unit suitable for generating a dummy sampling signal, which is sampled from a dummy pixel signal outputted from a dummy pixel array by using a correlated double sampling, based on the first ramp signal;
an active sampling signal generation unit suitable for generating an active sampling signal, which is sampled from an active pixel signal outputted from an active pixel array by using a correlated double sampling, based on the second ramp signal, and
a comparison unit suitable for comparing the dummy sampling signal with the active sampling signal.

2. The analog-to-digital converter of claim 1, wherein the dummy pixel array includes an optical black (OB) pixel array.

3. The analog-to-digital converter of claim 1, wherein the dummy sampling signal generation unit and the active sampling signal generation unit have a differential input structure using a same circuit.

4. The analog-to-digital converter of claim 1, wherein the dummy sampling signal generation unit includes:
a first switch suitable for controlling a transmission of the dummy pixel signal;
a first blocking capacitor coupled between an input node of the first ramp signal and an output node of the first switch; and
a first signal storage capacitor coupled to the output node of the first switch, and suitable for providing the dummy pixel signal.

5. The analog-to-digital converter of claim 4, wherein the active sampling signal generation unit includes:
a second switch suitable for controlling a transmission of the active pixel signal;
a second blocking capacitor coupled between an input node of the second ramp signal and an output node of the second switch; and
a second signal storage capacitor coupled to the output node of the second switch, and suitable for providing the active sampling signal.

6. The analog-to-digital converter of claim 5, wherein the first switch and the second switch have a same element, the first blocking capacitor and the second capacitor have a same element, and the first signal storage capacitor and the second signal storage capacitor have a same element.

7. The analog-to-digital converter of claim 1, wherein the active pixel signal and the dummy pixel signal have a same noise characteristic, and the first ramp signal and the second ramp signal have a same noise characteristic.

8. The analog-to-digital converter of claim 1, wherein an input of the comparison unit is expressed as, $$\text{Vin}p-\text{Vin}m=(\text{RAMP}-\text{RAMP\_REF})-(\text{APS\_O}-\text{OB\_O}),$$

where Vinp−Vinm denotes the input of the comparison unit, RAMP denotes the first ramp signal, RAMP_REF denotes the second ramp signal, APS_O denotes the active pixel signal and OB_O denotes the dummy pixel signal.

9. The analog-to-digital converter of claim 1, wherein the dummy pixel array has a same horizontal characteristic as the active pixel array.

10. The analog-to-digital converter of claim 1, wherein dummy pixels included in the dummy pixel array are matched one to one with active pixels included in the active pixel array at each column.

11. An analog-to-digital converter, comprising:
a correlated double sampling (CDS) array,
wherein the CDS array includes a CDS circuit at each column, and
wherein the CDS circuit includes:
a dummy sampling signal generation unit suitable for generating a dummy sampling signal, which is sampled from a dummy pixel signal outputted from a dummy pixel array by using a correlated double sampling;
an active sampling signal generation unit suitable for generating an active sampling signal, which is sampled from an active pixel signal outputted from an active pixel array by using a correlated double sampling; and
a comparison unit suitable for comparing the dummy sampling signal with the active sampling signal.

12. The analog-to-digital converter of claim 11, wherein the dummy pixel array includes an optical black (OB) pixel array.

13. A CMOS image sensor, comprising:
an active pixel array suitable for generating an active pixel signal;
a dummy pixel array suitable for generating a dummy pixel signal;
a row driver suitable for controlling the active pixel array and the dummy pixel array to simultaneously operate at a same column; and
a correlated double sampling (CDS) array suitable for generating an active sampling signal and a dummy sampling signal, which are sampled from the active pixel signal and the dummy pixel signal by using a correlated double sampling, respectively, based on a first ramp signal and a second ramp signal, and comparing the active sampling signal with the dummy sampling signal.

14. The CMOS image sensor of claim 13, wherein the dummy pixel array includes an optical black (OB) pixel array.

15. The CMOS image sensor of claim 13, wherein the CDS array includes a CDS circuit at each column, and wherein the CDS circuit includes:
- a dummy sampling signal generation unit suitable for generating the dummy sampling signal sampled from the dummy pixel signal based on the first ramp signal;
- an active sampling signal generation unit suitable for generating the active sampling signal from the active pixel signal based on the second ramp signal; and
- a comparison unit suitable for comparing the dummy sampling signal with the active sampling signal.

16. The CMOS image sensor of claim 15, wherein the dummy sampling signal generation unit and the active sampling signal generation unit include a differential input structure using a same circuit.

17. The CMOS image sensor of claim 15, wherein an input of the comparison unit is expressed as, $$Vinp-Vinm=(RAMP-RAMP\_REF)-(APS\_O-OB\_O),$$

where $Vinp-Vinm$ denotes the input of the comparison unit, RAMP denotes the first ramp signal, RAMP_REF denotes the second ramp signal, APS_O denotes the active pixel signal and OB_O denotes the dummy pixel signal.

18. The CMOS image sensor of claim 13, wherein the active pixel signal and the dummy pixel signal have a same noise characteristic, and the first ramp signal and the second ramp signal have a same noise characteristic.

19. The CMOS image sensor of claim 13, wherein the dummy pixel array is disposed along a row direction to form at least a row and to have a same horizontal characteristic as the active pixel array.

20. The CMOS image sensor of claim 13, wherein dummy pixels included in the dummy pixel array are matched one to one with active pixels included in the active pixel array at each column.

21. A CMOS image sensor, comprising:
- an active pixel array suitable for generating an active pixel signal;
- a dummy pixel array suitable for generating a dummy pixel signal;
- a row driver suitable for controlling the active pixel array and the dummy pixel array to simultaneously operate at a same column; and
- a correlated double sampling (CDS) array suitable for generating an active sampling signal and a dummy sampling signal, which are sampled from the active pixel signal and the dummy pixel signal by using a correlated double sampling, respectively, and comparing the active sampling signal with the dummy sampling signal.

22. The CMOS image sensor of claim 21, wherein the dummy pixel array includes an optical black (OB) pixel array.

23. The CMOS image sensor of claim 21, wherein the dummy pixel array is disposed along a row direction to have a same horizontal characteristic as the active pixel array.

24. A CMOS image sensor, comprising:
- an active pixel array suitable for generating an active pixel signal;
- a dummy pixel array suitable for generating a dummy pixel signal, wherein the dummy pixel array includes dummy pixels corresponding one to one to active pixels included in the active pixel array at each column;
- a row driver suitable for controlling the active pixel array and the dummy pixel array to simultaneously operate at a same column; and
- a correlated double sampling (CDS) array suitable for generating an active sampling signal and a dummy sampling signal, which are sampled from the active pixel signal and the dummy pixel signal by using a correlated double sampling.

25. The CMOS image sensor of claim 24, wherein the dummy pixel array includes an optical black (OB) pixel array.

* * * * *